SELF-SEATING CONTACT HEAD FOR MAGNETIC MEMORY DRUM

Filed April 4, 1960 2 Sheets-Sheet 1

Jay M. Hansen,
Zaven Atamian,
*INVENTORS.*
BY.

Ernest L. Olechna

*AGENT.*

Jay M. Hansen,
Zaven Atamian,
INVENTORS.
BY.
Ernest F. Oberle
AGENT.

United States Patent Office 3,022,494

Patented Feb. 20, 1962

3,022,494

SELF-SEATING CONTACT HEAD FOR MAGNETIC MEMORY DRUM

Jay M. Hansen, Santa Monica, and Zaven Atamian, Sherman Oaks, Calif., assignors to Hughes Aircraft Company, Culver City, Calif., a corporation of Delaware Filed Apr. 4, 1960, Ser. No. 19,960

9 Claims. (Cl. 340—174.1)

This invention relates to magnetic transducers for recording, reproducing, or erasing magnetic records and, more particularly, to magnetic transducers for operation in contact with the moving surface of a magnetic memory drum.

Prior art magnetic recording techniques for information storage have employed a rotating drum coated with a suitable magnetic material. The magnetic transducers conventionally used have operated at some fixed spacing from the drum surface. Although it has long been known that a more efficient recording system would be obtained if the transducer were maintained in contact with the moving surface, practical difficulties have prevented the widespread use of contact recording. These difficulties result from the severe requirements of electronic digital computing systems.

In contemporary computer systems, which operate at extremely high frequencies, it is most desirable to record those frequencies in a memory. Further, it is desirable to obtain relatively large output voltages from the memory in order to reduce the number of electronic components which must be used. These factors dictate a requirement that the surface of the magnetic drum must maintain a relatively high speed with respect to the recording head or transducer.

In fact, the speed requirement has been such that, using the typical magnetic oxide coating as the recording surface, contact recording was completely impractical because of the enormous frictional heating and wear which occurs at the point of contact between the transducer and the drum surface. Because of this, it has been necessary to maintain a space between the transducer and the drum surface. The existence of such a space seriously impairs the efficiency of the magnetic recording system in that output signal levels are relatively low and the information storage density is reduced. More recently, the development of recording transducers utilizing ferrite materials, and the development of metallic alloy coated recording surfaces has made contact recording feasible.

One of the more serious problems encountered in the use of such heads has been the design of a mounting and support structure which would be suitable for contact recording. The requirements of contact recording are that the head must be free to move in certain modes or degrees of freedom and yet be constrained from movement in other modes. Further, the head must be maintained in contact with the drum surface through any irregularities which may appear in that surface, and must make such a contact with the surface that chatter or excessive vibration of the head is avoided.

It is therefore an object of this invention to provide an improved magnetic head mounting and support structure for use in a contact system of recording.

It is another object of this invention to provide a structure of the type referred to which reduces magnetic head vibration to a minimum.

It is still another object of this invention to provide a structure which provides the desired degrees of freedom of movement of a magnetic head while constraining all other undesired degrees of freedom of movement.

It is a still further object of this invention to provide a structure which maintains contact between the magnetic heads and the recording surface of the medium under operating conditions.

Briefly described, this invention is a head mounting and support structure in which the transducer element, comprising a pair of ferrite core elements and an associated winding, is mounted on a so-called sled assembly. The sled assembly, because of the nature of its construction and mounting, is free to move in the desired mode, and constrained from motion in undesired degrees of freedom. The sled assembly is maintained in contact with the surface of the recording medium at three points to achieve stability. This contact between the sled assembly and the drum surface is maintained by a spring-loaded screw arrangement which in turn loads the sled assembly in a manner which provides minimum vibration and optimum stability.

Further and additional objects and advantages will become apparent hereinafter during the detailed description of an embodiment of the invention illustrated by way of example in the accompanying drawings in which.

Figure 1:
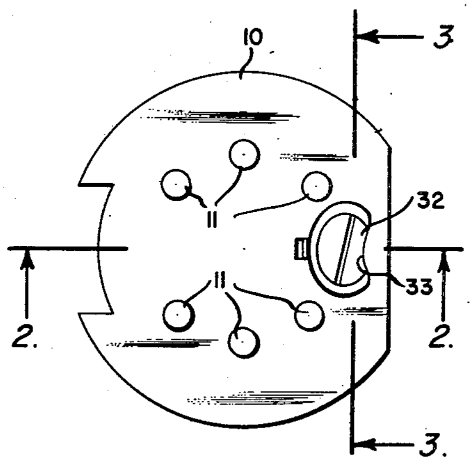
FIG. 1 is a plan view of the terminal face of the head assembly.
Figure 2:
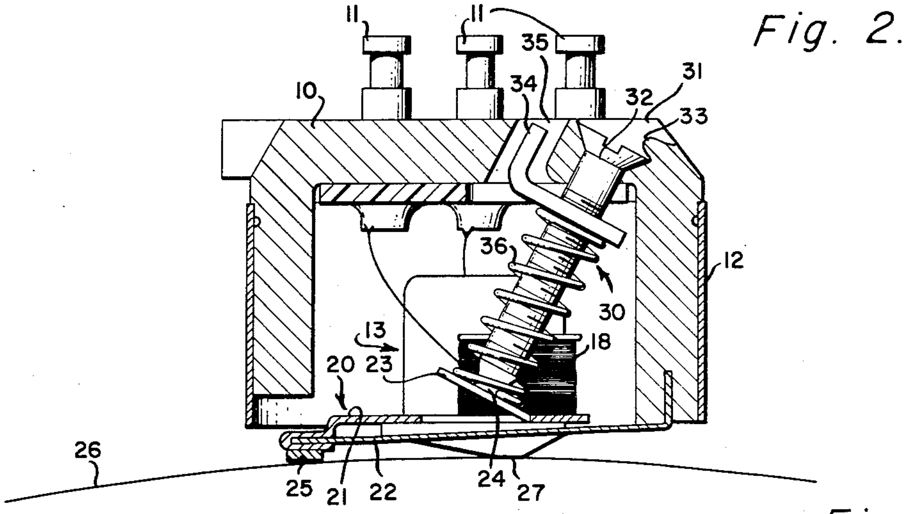
FIG. 2 is a cross-sectional view taken along the line 2—2 of FIG. 1.
Figures 3, 4:
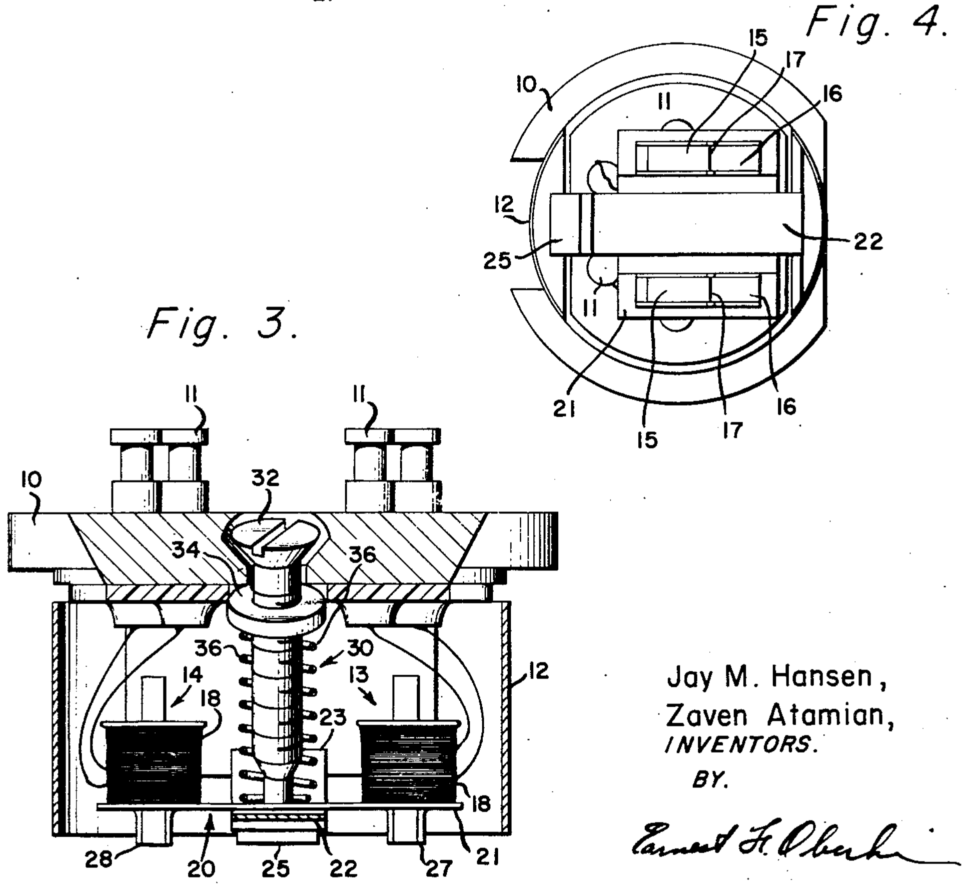
FIG. 3 is a cross-sectional view taken along the line 3—3 of FIG. 1.
FIG. 4 is a plan view of the contact face of the head assembly.

Turning now to FIG. 1, there is shown the main support structure 10 which has electrical terminals 11 mounted thereon. In FIGS. 2, 3, and 4, the terminals 11 are shown extending through the support structure 10 to provide electrical connection to the magnetic heads to be described below. A magnetic shield 12 which may be made of mu-metal or other suitable magnetic material is shown in position, surrounding the entire head mounting and support structure.

The details of construction of the magnetic heads themselves are not shown since many head configurations are suitable for use with this invention. The electrical and magnetic characteristics of a typical head which could be used is described in U.S. Patent No. 2,852,618, entitled "Electromagnetic Transducer," issued to J. M. Hansen on September 16, 1958.

In general, two magnetic head assemblies 13 and 14 form a part of this invention. Each of these assemblies is used in a conventional manner to record, reproduce, or erase magnetic records and comprises a pair of cores 15 and 16 in FIG. 4, which are butted together to form a core structure including a small airgap 17, and a winding 18 magnetically coupled to the core structure and connected to the terminals 11, as shown. The cores 15 and 16 are made of ferrite or other magnetic material which is relatively wear resistant. As can be seen, each of the magnetic head assemblies 13 and 14 may be used independently to record, reproduce, or erase information on a separate track. The magnetic head assembly 13 includes a contact portion 27 which comprises one of the surfaces of the core structure. The magnetic head assembly 14 includes a similar contact portion 28.

Figure 5:
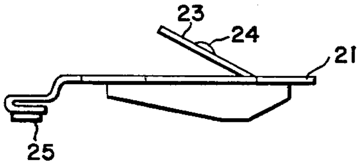
FIG. 5 is an elevational view of the head support and shield portion of the sled assembly.
Figure 6:
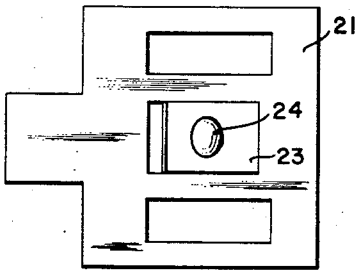
FIG. 6 is a plan view of the head support and shield portion of the sled assembly.
Figure 7:
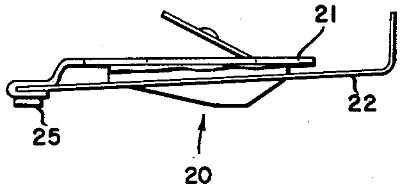
FIG. 7 is an elevational view of the sled assembly with a portion broken away to show the details of construction.

The magnetic head assemblies 13 and 14 are mounted in a sled assembly 20 which is adapted for limited movement, as will be described below. Details of the sled assembly 20 are shown in FIGS. 5–7. The sled assembly 20 comprises a head support and shield portion 21, and a spring portion 22. The head support and shield portion 21 is generally rectangular in shape and is provided with a tongue at one side thereof. This tongue is adapted to be crimped to receive one end of the spring portion 22 forming a mechanical connection therewith. The head support and shield portion 21 which may be made of mu-metal or other suitable magnetic shielding material is further provided with two rectangular openings for receiving the two magnetic head assemblies 13 and 14 and to provide shielding for a portion of the assembly. The head support and shield portion 21 is also provided with a protruding or upturned segment 23 which is in turn provided with a button 24.

The spring portion 22 comprises a rectangular strip of resilient material such as beryllium copper of relatively small thickness. As stated above, one end of the spring portion 22 is crimped into mechanical connection with the head support and shield portion 21, and the other end of the spring portion 22 is bent upwards at approximately a right angle and inserted into the main support structure 10 (see FIG. 2) in such a manner that a permanent connection is made between the main support structure 10 and the spring portion 22. As can be seen, the sled assembly 20 is free to move with respect to the main support structure 10 because of its unique connection to the main support structure. However, relative movement between the head support and shield portion 21 and the spring portion 22 is also possible because of the unique connection between these members. A pad 25 forms a part of the sled assembly 20 and is attached to the head support and shield portion 21 at the free end of the sled assembly 20.

As can be seen in FIGS. 2–4, the sled assembly 20 is urged against a medium 26 by a spring-loaded screw arrangement 30. The medium 26 is adapted for relative motion with respect to the head mounting and support structure and may be, for example, the surface of a rotatable drum which has been plated with a suitable magnetizable material. The spring-loaded screw arrangement 30 provides pressure against the protruding segment 23 of the head support and shield portion 21 of the head assembly. The spring-loaded screw arrangement 30 comprises a captive screw 32 which has its head portion mounted in a recess 31 in the main support structure 10 and is held in position by a retaining portion 33 of the main support structure 10. The spring-loaded screw arrangement 30 further includes a threaded dog 34 having a portion bent at a right angle. This portion is adapted for insertion in a cavity 35 in the main support structure 10, constraining rotation of the threaded dog 34. This constraint causes the threaded dog 34 to advance or retract along the axis of the screw 32 in response to rotation of the screw 32. The screw 32 is surrounded by a steel spring 36 which in turn bears between the protruding segment 23 of the sled assembly 20 and the threaded dog 34. It can be seen that rotation of the screw 32 advances or retracts the dog 34 along the axis of the screw, compressing the spring 36 and controlling its tension. Since the spring 36 transmits a force to the protruding segment 23 of the head support and shield portion 21 of the sled assembly 20, the screw 32 provides control over the pressure of the sled assembly 20 against the medium 26. The spring-loaded screw arrangement 30 maintains contact of the sled assembly 20 with the medium 26 at three points; these three points comprising contact portions 27 and 28 of each of the two magnetic head assemblies 13 and 14 and the pad 25. The spring-loaded screw arrangement 30 is mounted such that its pressure against the sled assembly 20 is exerted at an acute angle with respect to the sled assembly 20. The purpose of this angle will be discussed below.

Figure 8:
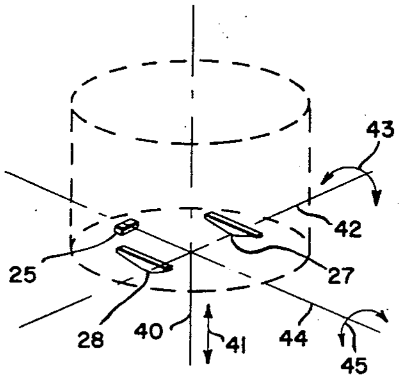
FIG. 8 is a diagrammatic sketch showing the modes of movement or degrees of freedom of the magnetic head.

Turning now to FIG. 8, the head mounting and support structure is shown schematically with orientation being supplied by the three points of support shown. These points of support are the pad 25 and the portions 27 and 28 of each of the magnetic head assemblies 13 and 14. In general, there are six degrees of freedom of motion possible. These include three linear motions and three rotational motions. One of the linear motions and two of the rotational motions are necessary to the proper operation of the device constituting this invention. These are the linear motions along the axis 40 shown by the arrows 41 and the rotational motions about the axes 42 and 44 shown by the arrows 43 and 45, respectively.

The linear motion shown by the arrows 41 is necessary to maintain contact between the magnetic head assemblies 13 and 14 and the medium 26. The limits of this motion are controlled by the surface of the medium 26. The rotational motion shown by the arrows 43 is necessary to compensate for deviations in the surface of the medium in the direction of medium travel. Control of this motion is provided by the distance between the pad and the other points of contact. The rotational motion shown by the arrows 45 is necessary to compensate for deviations in the surface of the medium in a direction perpendicular to the direction of medium travel. Control of this motion is provided by the use of two magnetic heads and by the relatively large separation of these heads which greatly increases the stability of the assembly.

The remaining three degrees of freedom of motion, namely, linear motions along the axes 42 or 44, or rotational motion about the axis 40 are denied the sled assembly by the construction of head mounting and support structure, as described above.

The angular mounting of the spring-loaded screw assembly provides, in addition to the force tending to maintain pressure against the medium, a force tending to maintain tension in the spring portion 22. Tension in the spring portion 22 tends to prevent buckling of the spring portion while allowing desired motion. This permits the use of a lighter spring member giving more freedom to move in the desired mode. It can be further seen that the line of action of the spring-loaded screw arrangement 30 occurs between the pad 25 and the contact portions 27 and 28 of the magnetic head assemblies 13 and 14 at approximately one-third the distance between the contact portions 27 and 28 and the pad 25, measured from the contact portions. This provides relatively equal loading of each of the three points of contact and tends to maintain vibrational stability.

Thus, there has been described an improved magnetic head mounting and support structure for use in a contact system of recording which maintains contact between the magnetic head and the surface of the medium under operating conditions. It can also be seen from the foregoing explanation that the head mounting and support structure provides the desired degrees of freedom of movement of the magnetic heads while constraining all other undesired degrees of freedom of movement and which reduces vibration to a minimum under operating conditions.

What is claimed is:

1. An electromagnetic transducer assembly for recording, reproducing, or erasing information on a magnetizable medium movable relative to said assembly comprising: a support structure; resilient means mounted in said support structure and having a contact surface thereon adapted to engage said medium; a pair of electromagnetic transducers mounted on said resilient means, each of said transducers having a surface adapted to engage said medium, said transducer surfaces and said contact surface defining a three point support; and means mounted in said support structure and engaging said resilient means for urging said transducer surfaces and said contact surface into engagement with said medium.

2. An electromagnetic transducer assembly for recording, reproducing, or erasing information on a magnetizable medium movable relative to said assembly comprising: a support structure; resilient means mounted in said support structure and adapted to linear movement along an axis perpendicular to the plane of said medium and constrained from rotational movement about said axis, said resilient means having a contact surface thereon adapted to engage said medium; a pair of electromagnetic transducers mounted on said resilient means, each of said transducers having a surface adapted to engage said medium, said transducer surfaces and said contact surface defining a three point support; and means mounted in said support structure and contacting said resilient means for urging said transducer surfaces and said contact surface into engagement with said medium.

3. An electromagnetic transducer assembly for recording, reproducing, or erasing information on a magnetizable medium movable relative to said assembly comprising: a support structure; resilient means mounted in said support structure and adapted to linear movement only along an axis perpendicular to the plane of said medium and constrained from rotational movement only about said axis, said resilient means having a contact surface thereon adapted to engage said medium; a pair of electromagnetic transducers mounted on said resilient means, each of said transducers having a surface adapted to engage said medium, said transducer surfaces and said contact surface defining a three point support; and means mounted in said support structure for urging said resilient means toward said magnetic medium so that said transducer surface and said contact surface are maintained in engagement with said medium.

4. An electromagnetic transducer assembly for recording, reproducing, or erasing information on a magnetizable medium movable relative to said assembly comprising: a support structure, a sled assembly mounted in said support structure and adapted to linear movement only along an axis perpendicular to the plane of said medium and constrained from rotational movement only about said axis; a pad mounted in said sled assembly and having a contact surface adapted to engage said medium; a pair of electromagnetic transducers mounted on said sled assembly, each of said transducers having a surface adapted to engage said medium, said transducer surfaces and said contact surface defining a three point support; and means mounted in said support structure for urging said sled assembly toward said medium so that said transducer surfaces and said contact surface engage said medium.

5. An electromagnetic transducer assembly for recording, reproducing, or erasing information on a magnetizable medium movable relative to said assembly comprising: a support structure; a sled assembly adapted to linear movement only along an axis perpendicular to the plane of said medium and constrained from rotational movement only about said axis; said sled assembly comprising, a spring portion mounted at one end thereof in said support structure, a head support portion connected to said spring portion at the free end thereof, said head suport portion having a protruding segment, a pair of electromagnetic transducers mounted on said head support portion, each of said transducers having a surface adapted to engage said medium, and a pad mounted on said head support portion and having a contact surface thereon adapted to engage said medium, said contact surface and said transducer surfaces defining a three point support; and means mounted in said support structure for urging said sled assembly toward said magnetizable medium to maintain said contact surface and said transducer surfaces in engagement with said medium.

6. An electromagnetic transducer assembly for recording, reproducing, or erasing information on a magnetizable medium movable relative to said assembly comprising: a support structure; a sled assembly adapted to linear movement only along an axis perpendicular to the plane of said medium and constrained from rotational movement only about said axis; said sled assembly comprising, a spring portion mounted at one end thereof in said support structure, a head support portion connected to said spring portion at the free end thereof, said head support portion having a protruding segment, a pair of electromagnetic transducers mounted on said head support portion, each of said transducers having a surface adapted to engage said medium, and a pad mounted on said head support portion and having a contact surface thereon adapted to engage said medium, said contact surface and said transducer surfaces defining a three point support; and means mounted in said support structure adapted to engage said protruding segment for urging said sled assembly toward said medium so that said contact surface and said transducer surfaces engage said medium and for maintaining tension in said spring portion.

7. An electromagnetic transducer assembly for recording, reproducing, or erasing information on a magnetizable medium movable relative to said assembly comprising: a support structure; a sled assembly comprising, a spring portion mounted at one end thereof in said support structure, a head support portion connected to said spring portion at the free end thereof, said head support portion having a protruding segment, a pair of electromagnetic transducers mounted on said head support portion, each of said transducers having a surface adapted to engage said medium, and a pad mounted on said head support portion and having a contact surface thereon adapted to engage said medium, said contact surface and said transducer surfaces defining a three point support; and a spring-loaded screw assembly adapted to engage said protruding segment for urging said contact surface and said transducer surfaces into engagement with said medium and for maintaining tension in said spring portion, said spring-loaded screw assembly comprising a screw mounted in said support structure, a dog responsive to rotation of said screw for moving along the length of said screw, and a spring adapted to be compressed by movement of said dog for providing pressure against said protruding segment.

8. An electromagnetic transducer assembly for recording, reproducing, or erasing information on a magnetizable medium movable relative to said assembly comprising: a support structure; a sled assembly adapted to linear movement only along an axis perpendicular to the plane of said medium and constrained from rotational movement only about said axis; said sled assembly comprising, a spring portion mounted at one end thereof in said support structure, a head support portion connected to said spring portion at the free end thereof, said head support portion having a protruding segment, a pair of electromagnetic transducers mounted on said head support portion, each of said transducers having a surface adapted to engage said medium, and a pad mounted on said head support portion and having a contact surface thereon adapted to engage said medium, said contact surface and said transducer surfaces defining a three point support; and a spring-loaded screw assembly adapted to engage said protruding segment for urging said contact surface and said transducer surfaces into engagement with said medium and for maintaining tension in said spring portion, said spring-loaded screw assembly comprising a screw mounted in said support structure, a dog responsive to rotation of said screw for moving along the length of said screw, and a spring adapted to be compressed by movement of said dog for providing pressure against said protruding segment.

9. An electromagnetic transducer assembly according to claim 8 in which said spring-loaded screw assembly applies a force for urging said contact surface and said transducer surfaces into engagement with said medium at a point between said contact surface and said transducer surfaces, said point being two-thirds the distance between said contact surface and said transducer surfaces, measured from said contact surface.

No references cited.